United States Patent [19]
Putt

[11] 3,992,132
[45] Nov. 16, 1976

[54] ENERGY CONVERSION SYSTEM

[76] Inventor: J. William Putt, 3278 West Cedar St., Allentown, Pa. 18104

[22] Filed: Feb. 4, 1975

[21] Appl. No.: 546,958

[52] U.S. Cl. .............................. 417/271; 417/273; 417/410; 417/420; 310/46; 310/103
[51] Int. Cl.² ..................... F04B 1/04; F04B 17/00; H02K 37/00
[58] Field of Search ........... 417/271, 410, 419, 420, 417/273, 413; 310/103, 46

[56] References Cited
UNITED STATES PATENTS

| | | | |
|---|---|---|---|
| 2,124,672 | 7/1938 | Pershing | 310/46 |
| 2,279,690 | 4/1942 | Lindsey | 310/46 |
| 2,281,081 | 4/1942 | Sheldon | 310/46 |
| 3,089,425 | 5/1963 | Sprague | 310/103 |

Primary Examiner—William L. Freeh
Assistant Examiner—G. P. LaPointe
Attorney, Agent, or Firm—Beveridge, DeGrandi, Kline & Lunsford

[57] ABSTRACT

Relative motion is provided between a set of primary magnets positioned along a path of relative motion, and a set of secondary magnets positioned along the path of motion to confront the primary magnets. Such motion causes the primary magnets to displace the secondary magnets in directions transverse to the path. Power output means are driven by transverse displacement of the secondary magnets. The polarities of the magnets are such that the forces of magnetic attraction in one direction parallel to the path are substantially equal to the forces of magnetic repulsion in the opposite direction parallel to the path, whereby a minimum of energy is required to produce said relative motion.

14 Claims, 7 Drawing Figures

ENERGY CONVERSION SYSTEM

This invention relates to an energy conversion system wherein primary motion in a given path produces secondary motion in a direction transverse to the given path.

It has long been known that primary motion in a given path may produce secondary motion in a transverse direction by means of mechanical components such as cams, levers, gears and other simple mechanical movements either used alone or in combination with each other. These prior systems have required physical contact between relatively movable elements and thus have involved substantial energy losses due to the friction which is inherent in such contact.

The present invention is characterised in one respect by the fact that there is no physical contact between the relatively movable elements. This result is achieved by the use of relatively movable sets of magnets, one set being movable transversely to the path of relative movement.

Another aspect of the invention involves the balancing of the magnetic forces of attraction and repulsion. This is achieved by having a plurality of interconnected primary magnets with polarities which coact with the polarities of the transversely movable secondary magnets so that the forces of magnetic attraction in one direction parallel to the given path of relative movement are substantially equal to the forces of magnetic repulsion in the opposite direction parallel to the given path. This arrangement results in a minimization of the energy required to produce relative movement in the given path between the primary and secondary magnets.

According to the present invention, a set of primary magnets are disposed along an endless path. A set of secondary magnets are also disposed along the path, each being movable in a direction transverse to the path.

Drive means are provided for producing relative movement between the primary and secondary magnets along the endless path so that each primary magnet relatively moves successively into alignment with the secondary magnets, thereby producing transverse movement of the secondary magnets. Power-output means are operated by this transverse movement of the secondary magnets. The polarities of the magnets are such that the forces of magnetic attraction in one direction parallel to the endless path are substantially equal to the forces of magnetic repulsion in the opposite direction parallel to the endless path, whereby magnetic forces impose no substantial resistance to relative movement of the magnets in their endless path.

In the preferred embodiment of the invention which is illustrated herein, the endless path is circular, all of the primary magnet means being fixed with respect to each other and supported by a common rotary shaft. The primary magnets all have the same polarity in the given path. The secondary magnets, proceeding along the given path, are of alternating polarities, so that a primary magnet during its movement will alternately attract and repel successive secondary magnets. It is also preferred that the power output means be fluid pumps connected to each of the secondary magnets to create fluid pressure in response to the transverse movement of the secondary magnets. These fluid pumps are connected together so as to provide an output of pressurized fluid which may be stored under pressure, used when desired to drive a fluid-operated motor and then recirculated through a reservoir to the individual pump means for each of the secondary magnets.

A primary utility for this invention is in the propulsion of land vehicles such as automobiles, trucks, rail vehicles and the like. Individual hydraulic motors may be provided for each drive wheel in order to achieve the known advantages of excellent accelleration and precisely controllable decelleration to minimize the use of the vehicle brakes.

For a more complete understanding of the concepts of the invention, reference is made to the accompanying drawings which illustrate preferred embodiments of the invention.

Figure 1:
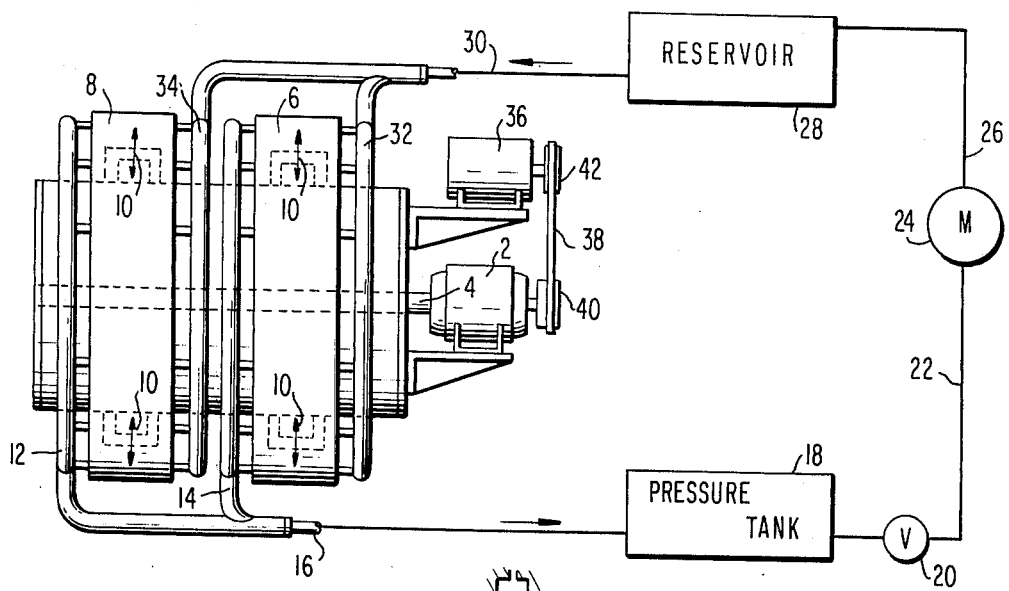
FIG. 1 is a schematic view of a system utilizing dual in-line energy conversion means of the preferred type for automotive propulsion.

Referring to FIG. 1, it will be seen that an hydraulic motor 2 is connected to the main shaft 4 of the apparatus, the main shaft carrying two rotor assemblies which include the primary magnet means of the invention.

The shaft may also carry a flywheel to minimize fluctuations in its rotational velocity. As in present automobiles, rotation of the system may be initiated by engaging a normally-disengaged electric starter motor with a ring gear on the flywheel. Housed with the blocks 6 and 8 are the secondary magnet means which are movable in a direction which lies radial to the axis of the shaft 4. These magnets are shown in broken lines and their path of movement is indicated by the arrows 10. Their movement operates individual fluid pumps to produce an hydraulic output pressure in the manifolds 12 and 14, this pressurized fluid ultimately going by conduit 16 to the pressure tank 18. The pressure tank 18 may be a conventional hydraulic accumulator, with its output connected via valve 20 to a conduit 22 leading to the hydraulic motor 24. The motor exhaust fluid is carried by conduit 26 to a reservoir 28 which feeds the return conduit 30 and the fluid inlet manifolds 32 and 34. For controlled deceleration, the conduit 22 may be provided with a control valve. Some installations may require a valved dump line leading directly from the tank 18 to the reservoir 28. The motor 2 in addition to rotating the main shaft 4, drives a generator 36 by means of a belt 38 operable over the respective pulleys 40 and 42. The generator may be connected to a conventional circuit for charging the battery which energizes the electric starter motor.

Figure 2:
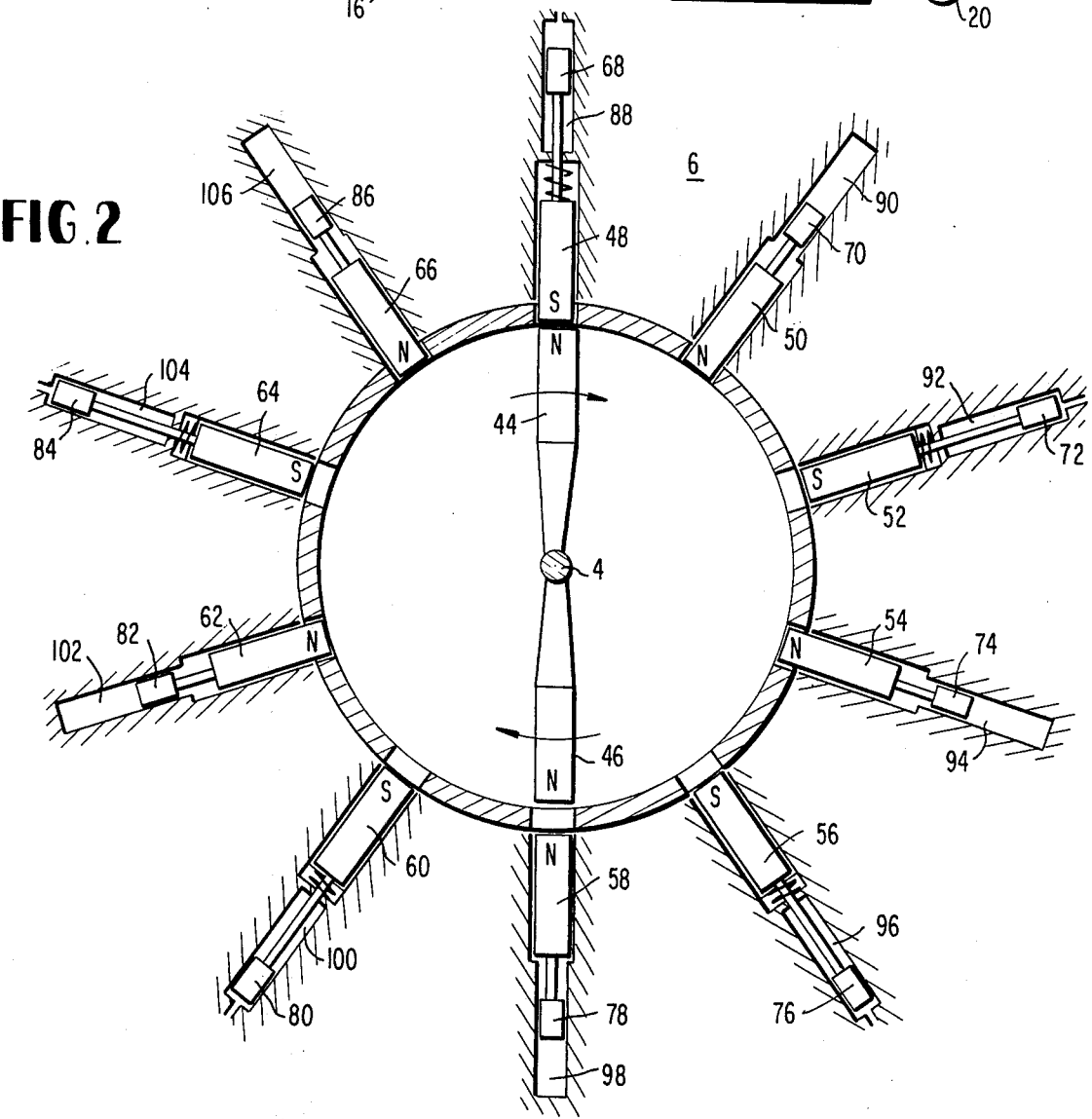
FIG. 2 is a view through a radial plane of the energy conversion means of the invention.

FIG. 2 illustrates the preferred arrangement of the magnets in the system contained with the block 6 of FIG. 1. In FIG. 2, it will be seen that the shaft 4 carries a rotor assembly provided with a pair of diametrically-opposed magnets 44 and 46 which move in a circular endless path in the same direction as the shaft 4 continues its rotation.

The stator assembly shown in FIG. 2 includes ten magnets, each of which is movable in a direction which lies radial with respect to the shaft 4, and thus is transverse to the endless circular path followed by the primary magnets 44 and 46 of the rotor assembly. As the shaft is rotated, the primary magnets 44 and 46 move successively into the magnetic fields of the secondary magnets in the stator, thus influencing the secondary magnets to move transversely with respect to the paths followed by the primary magnets 44 and 46.

The secondary magnets 48–66 are each connected to a power output means. Preferably, a rod is connected to the piston of an hydraulic pumping means. The pistons of the pumping means are designated 68–86 and they are operable within the cylinders 88–106, formed by bores in the block 6. A cursory study of the indicated polarities of the respective magnets in FIG. 2 reveals that the secondary magnets 48, 52, 56, 60 and 64 are attracting magnets with respect to the primary magnets 44 and 46. Therefore, as the magnets 44 and 46 move into the fields of these attracting magnets, the attracting magnets will be moved radially inwardly, this movement also being transmitted to the associated pistons 68, 72, 76, 80 and 84. This inward movement applies a pressure on the fluid in the respective cylinder 88, 92, 96, 100 and 104 to provide the output pressure of the system. This particular valving arrangement used will be described below in connection with FIG. 3.

Conversely, the secondary magnets 50, 54, 58, 62 and 66 are repelling magnets with respect to the primary magnets 44 and 46. As a result of this relationship, the movement of the primary magnets 44 and 46 toward the magnets 50, 54, 58, 62 and 66 will drive these secondary magnets radially outwardly, forcing their pistons 70, 74, 78, 82 and 86 in a radially outward direction to apply pressure to the hydraulic fluid in the associated cylinder chamber 90, 94, 98, 102 and 106.

It will be noted in FIG. 2 that the magnets are disposed so that the primary magnets 44 and 46 are respectively aligned with the attracting magnet 48 and the repelling magnet 58. Thus, the magnet 48 and its associated piston 68 have been drawn radially inwardly to perform a pumping stroke, and the magnet 58 and its piston 78 have been repelled radially outwardly to perform a pumping stroke.

An important consideration in the disposition of the secondary magnets is that their polarities are such that the forces of magnetic attraction which they exert on the primary magnets in one direction parallel to the circular path of the primary magnets is substantially equal to the forces of magnetic repulsion in the opposite direction parallel to the path of the primary magnets. Thus, magnetic forces impose no substantial resistance to rotation of the shaft 4 and movement of the primary magnet assembly. For example, as the primary magnet assembly moves in a clockwise direction from the illustrated position, the primary magnet 44 will be passing from an attracting field into a repelling field. Simultaneously, the magnet 46 will be moving from a repelling field into an attracting field. These forces are substantiaally balanced in the path and direction of movement of the primary magnets 44 and 46, so that the energy requirements for moving the primary magnet assembly are extremely low. This substantially balanced condition may be achieved by having all of the secondary magnets of equal size and magnetic power. However, inasmuch as attracting forces are greater than repelling forces, it is preferred that the repelling secondary magnets be more powerful than their attracting counterparts. The balanced condition will continue throughout the rotation of the shaft 4 and the movement of the primary magnets 44 and 46 in their circular endless path.

Figure 3:
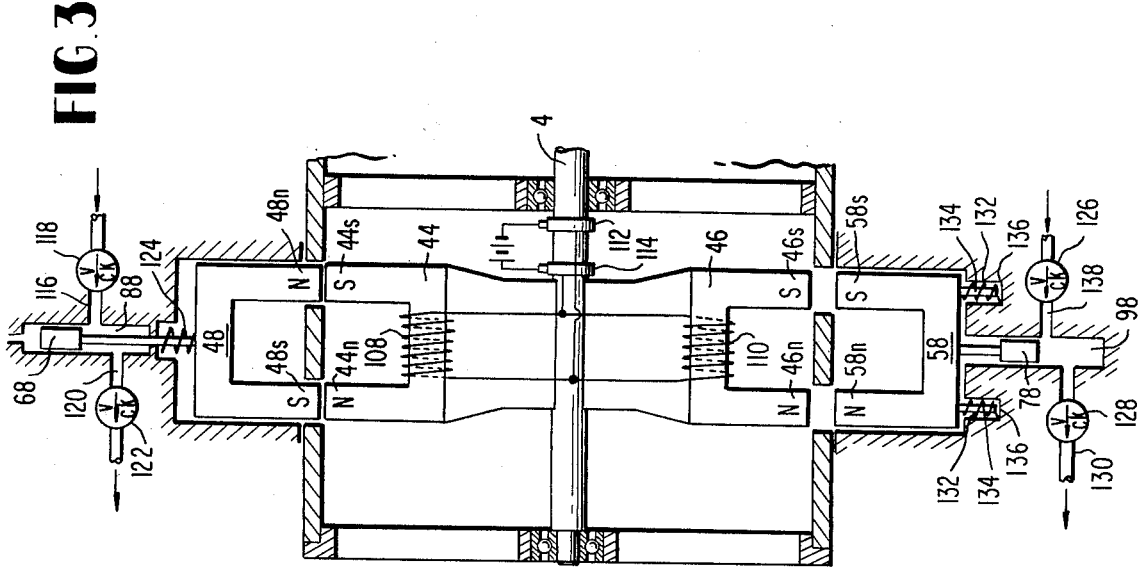
FIg. 3 is a transverse sectional view through the energy conversion means of FIG. 2.

It is preferred that the primary and secondary magnets each have a pair of poles, and this relationship is best seen in FIG. 3 where the primary magnets 44 and 46 have poles 44n, 44s, 46n and 46s. The secondary magnets also are provided with pairs of poles, these poles being designated in FIG. 3 as 48n, 48s, 58n, and 58s. It will also be seen that the magnets 44 and 46 are preferably electromagnets, with the magnetic field being produced by windings schematically illustrated at 108 and 110 electrically connected to a source of direct current by means of slip rings 112 and 114.

In FIG. 3, the valving arrangements for the preferred piston pumps are shown. The pump associated with the attracting secondary magnet 48 has an inlet conduit 116 which receives fluid from the inlet manifold 32 (not shown) via a check valve 118. The fluid discharge from cylinder 88 exits via a discharge passage 120 and an outlet check valve 122 which leads the pressurized fluid to the pressure manifold 14, the latter being shown in FIG. 1. Downward movement of the piston 68 under the influence of the attracting magnet 48 will force hydraulic fluid into the conduit 120, through the check valve 122 and into the pressure manifold. During this downward movement, fluid is prevented from going into the inlet conduit due to the presence of the inlet check valve 118. However, during the upward movement of the piston 68, the pressure is reduced so as to close the outlet check valve 122, open the inlet check valve 118 and permit the return fluid to enter the cylinder 88 via a conduit 116. The movement of the piston during this return stroke is produced by a tension spring 124 which is placed under tension as the magnet 48 moves downwardly, and then draws the magnet 48 and its associated piston 68 upwardly when the magnetic forces of the primary magnets 44 and 46 are removed therefrom.

The pump assembly associated with the repelling magnet 58 is similar to that previously described, but operates in the opposite direction so that radial outward movement of the magnet 58 and its associated piston 78 performs the pumping stroke. The magnetic repulsive forces drive the magnet 58 downwardly together with its piston 78 to pressurize the fluid in the cylinder 98. When this fluid is under pressure, it closes the inlet check valve 126 and opens the outlet check valve 128 to permit fluid to go to the pressure manifold 14 via the conduit 130.

When the primary magnet 46 is moved away from the secondary magnet 58, the secondary magnet 58 and its piston 78 moves upwardly under the influence of return springs 132. These return springs encircle the guide pins 134 which are slidably received in the recesses 136 of the apparatus. This upward movement reduces the pressure of the fluid in the cylinder 98, thus closing the outlet check valve 128, and opening the inlet check valve 126, thereby permitting fluid to flow into the inlet passage 138 from the inlet manifold 32. It will be observed in FIG. 2 that the disposition of the magnets is such that a unidirectional force will be applied to the shaft 4 whenever the primary magnets 44 and 46 are aligned with secondary magnets. In the position illustrated in FIG. 2, this force is directed upwardly, as the upper magnet 44 is attracted and the lower magnet 46 is repelled by the secondary magnets aligned therewith. The force would shift to the opposite direction as the magnets 44 and 46 move into the alignment with the next pair of secondary magnets 50 and 60. In order to achieve some balance in the system, it is desirable to have a number of primary and secondary magnet assemblies located on the same shaft, two such assemblies being shown in FIG. 1 but far more assemblies being contemplated for actual production models of the invention. When this is done, adjacent assemblies should have the location and polarities of their magnets arranged so as to equalize the radial forces imposed upon the main shaft 4. For example, the assembly associated with block 8 in FIG. 1 may be identical to that shown in FIG. 2, except that the magnets corresponding to 44 and 46 would have opposite polarities than those indicated in FIG. 2 so that at the position shown the upper magnet would be repelling and the lower magnet attracting, thus creating a downward force equal in magnitude but opposite in direction to that created by the assembly illustrated in FIG. 2.

Figure 4:
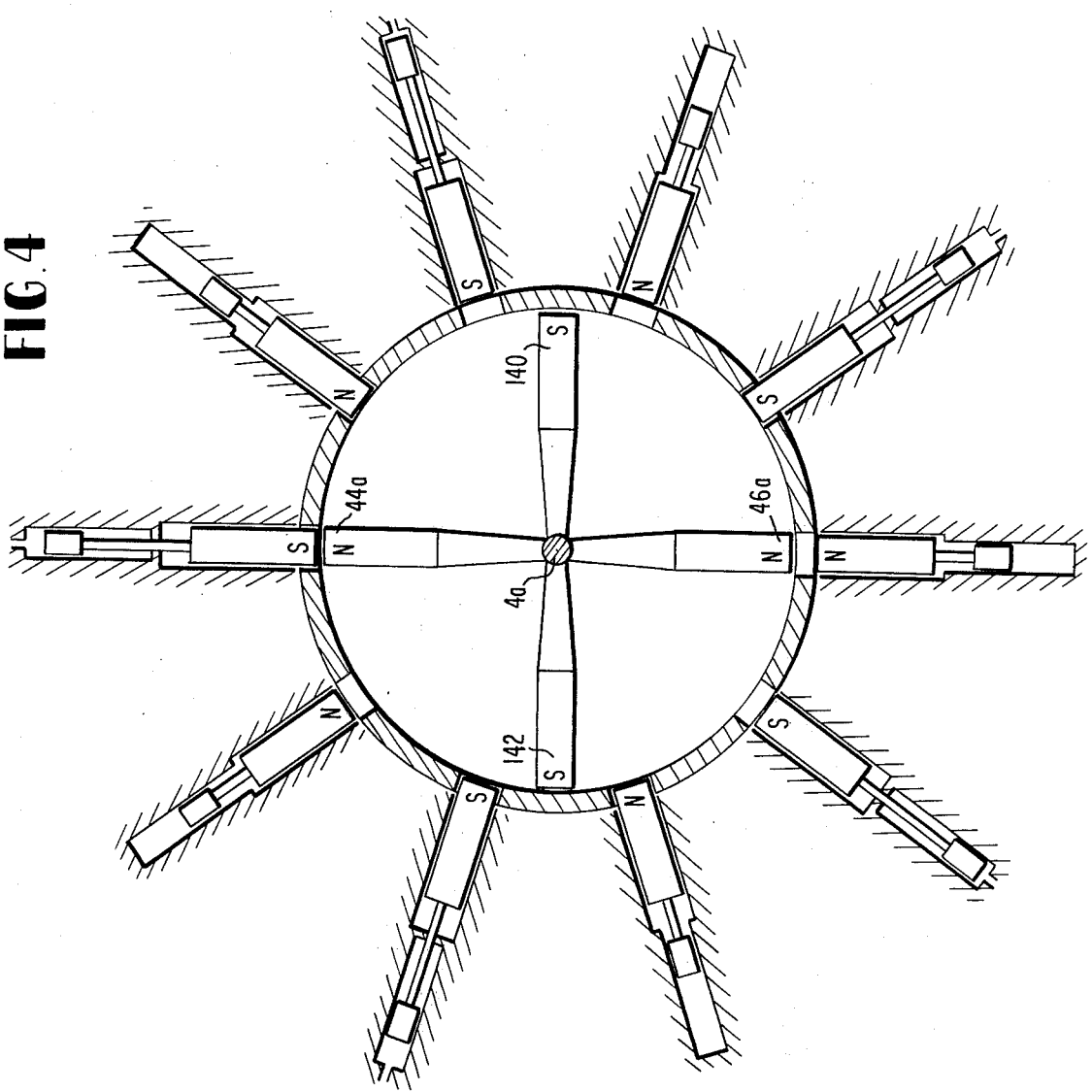
FIG. 4 illustrates an embodiment whereby supplementary magnet means are utilized on the rotor to avoid the use of return springs for the secondary magnets.

The embodiment of FIG. 4 is quite similar to that previously described in connection with FIGS. 2 and 3, so like reference numerals with the subscript *a* indicate corresponding elements. The improvement added to FIG. 4 pertains to the supplemental magnets 140 and 142 which are connected by arms to the shaft 4a. These magnets 140 and 142 may be significantly smaller and less powerful than the primary drive magnets 44a and 46a, inasmuch as the function of the supplemental magnets 140 and 142 is merely to return the secondary magnets and their associated pistons through the inactive part of their stroke, i.e. the intake portion of the piston movement. It is expected that the use of these magnets 140 and 142 will eliminate the need for the piston return springs 124 and 132.

It is possible to use double-acting hydraulic pumps in the system of FIG. 4, inasmuch as each of the secondary magnet means is subjected alternately to attracting and repelling magnetic forces by the rotor-carried magnets. When double-acting pumps are used, the supplemental magnets 140 and 142 are of a size capable of exerting the same magnetic force as the magnets 44a and 46a.

Double-acting pumps may be used with the system of FIGS. 2 and 3, simply by reversing the polarity of one of the magnets 44 or 46, and by rearranging the array of secondary magnets.

The secondary magnets in such a rearrangement would include an even number of pairs thereof so that, for example, 12 secondary magnets would appear in a view corresponding to FIG. 2. Diametrically opposed secondary magnets in this modification would have the same polarity, and the polarity of the secondary magnets would alternate along the circular endless path traversed by the primary magnets.

Figure 5:
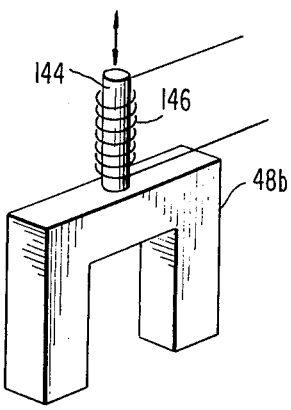
FIG. 5 shows an electrical power output means for the system.

Although the previously-discussed embodiments of the invention involve an hydraulic means driven by the secondary magnets, it is possible to have other types of power output means. For example, the secondary magnets may be connected to means for generating an electromotive force such as a piezoelectric generating means or the inductive means shown in FIG. 5 wherein the secondary magnet 48b carries a permanent magnet rod 144 which reciprocates within the electric induction coil 146.

Figure 6:
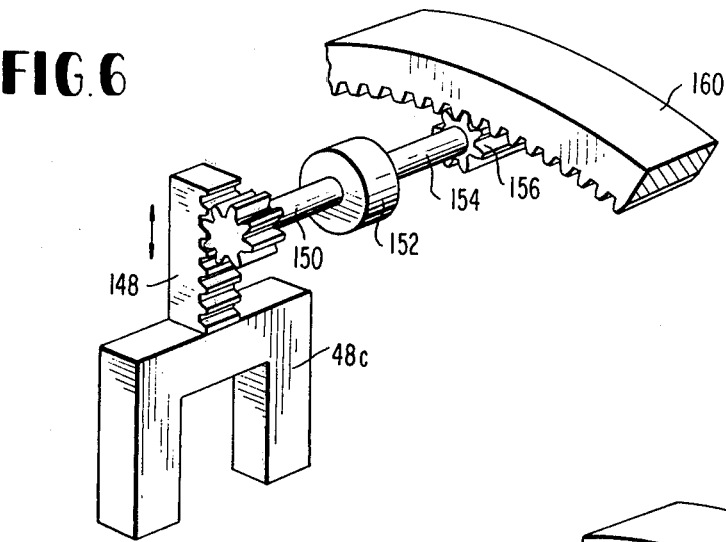
FIG. 6 shows a gear-actuated power output means for the system.
Figure 7:
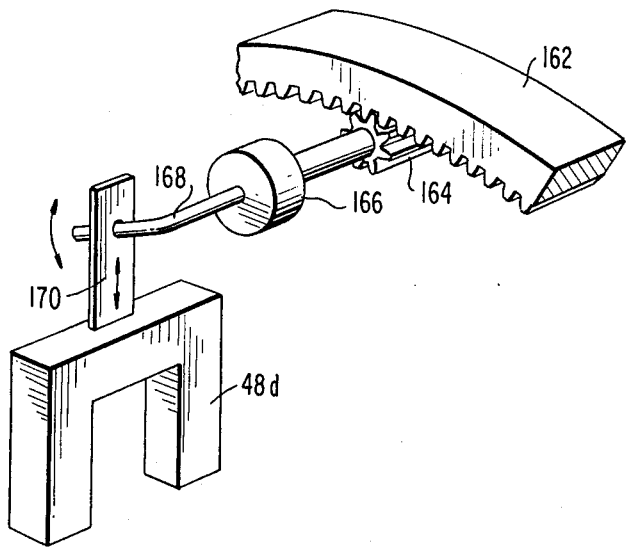
FIG. 7 shows a lever-actuated power output means.

Mechanical output means are also possible as shown in FIGS. 6 and 7. In FIG. 6, the secondary magnet 48c carries a rack gear 148 which engages the pinion gear 150. The pinion 150 drives a one-way clutch 152 whose output shaft 154 is connected to a second pinion gear 156, the latter being meshed with a driven ring gear 160 which meshes with similar assemblies on each of the secondary magnets.

The mechanical output means shown in FIG. 7 also involves a ring gear 162 driven by a pinion 164 connected to a one-way clutch 166. In this instance, however, the one-way clutch is driven by means of a lever arm 168 which is oscillated by the reciprocatory motion of extension 170 connected to the secondary magnet 48d.

The power of the magnets, their stroke, the piston size and the number of magnetic assemblies may vary widely and will be determined largely by the requirements of the hydraulic motor. The angular velocity of the rotor must be selected to provide sufficient time for the individual secondary magnets to move through their working strokes. An exemplary system constructed according to FIG. 2 using permanent magnets, will now be described. The primary magnets are selected to exert an attracting and repelling force of 4,000 pounds on the secondary magnets. Each of the pistons has a cross sectional area of 4 square inches, thus producing an output hydraulic pressure of 1,000 pounds. Each piston moves through a stroke of one-half inch. The construction shown in FIG. 2 will produce 20 working piston strokes for each revolution of the rotor assembly. The rotor is rotated at 60 r.p.m. with minimal input energy due to the rotational force balancing of the magnets. This will provide substantial output energy by delivering hydraulic fluid at a rate of 2,400 cubic inches per minute. In the event that a greater volume of fluid is required, additional assemblies may be placed on the shaft, two such assemblies being shown in the system of FIG. 1.

An increase in the pressure available may be realized by using electromagnets rather than permanent magnets for the primary magnets in the system. Seventy-five watts are required to actuate an electromagnet capable of exerting 10,000 pounds of force. Using such an electromagnet in the system described in the previous paragraph, and increasing the piston stroke to 1 inch, the pressure available will be 2 and one half times that previously described and the volume of fluid will be twice that attainable with the permanent magnet.

Of course many modifications to the disclosed embodiments will occur to persons skilled in the art. The magnets may be permanent magnets or electromagnets. The primary magnets may be stationary and the secondary magnets movable, so long as there is relative movement between the members in the direction of the endless path. The endless path may be circular, oval, elliptical, or any other shape whereby the relative movement repeatedly brings one set of magnets successively past the other set of magnets in the system. The transverse movement of the secondary magnets may be linear or arcuate, axial, radial, or combinations of these. The drive means for producing the relative movement along the endless path may be an hydraulic motor or even a manually-operable hand crank. The power output means may be hydraulic, electrical, mechanical or of some other nature. In view of the diverse embodiments and configurations which the invention may assume, it is emphasized herein that the invention is not limited only to the preferred disclosed embodiments but encompasses all systems utilizing the principles of the invention as set forth in the following claims.

I claim:

1. An energy conversion system comprising
   a first set of primary magnet means disposed along an endless path,
   a second set of secondary magnet means disposed along said endless path, each said secondary magnet means being transversely movable in a direction which lies transverse to said endless path,
   said first set and said second set being relatively movable in a direction substantially parallel to said endless path whereby relative movement brings each primary magnet means successively into alignment with each of the secondary magnet means whereby each secondary magnet means is moved transversely by the magnetic field of the primary magnet means,
   said magnet means having unchanging polarities such that throughout the relative movement of the magnet means, for each primary magnet means moving from a secondary magnet means which attracts to a secondary magnet means which repels it, there is another said primary magnet means moving from a secondary magnet means which repels it to a secondary magnet means which attracts it,
   power output means operatively connected to the secondary magnet means and operable in response to transverse movement of the secondary magnet means.

2. The energy conversion system of claim 1 wherein the endless path is circular.

3. The energy conversion system of claim 1 wherein said drive means moves the primary magnet means along said endless path.

4. The energy conversion system of claim 1 wherein the primary magnet means are radially aligned with the secondary magnet means.

5. The energy conversion system of claim 1 wherein the power output means includes a plurality of expansible chamber fluid pumps connected to said secondary magnet means.

6. The energy conversion system of claim 1 having first and second said primary magnet means positioned simultaneously to repel and attract different said secondary magnet means.

7. The energy conversion system of claim 1 wherein the endless path is circular and the primary magnet means includes diametrically opposed magnets having the same polarity, said secondary magnet means including diametrically opposed magnets of opposite polarity.

8. The energy conversion system of claim 1 wherein the primary magnet means is formed of electromagnets.

9. The energy conversion system of claim 1 wherein the primary magnet means are spaced at uniform intervals along said endless path, and the secondary magnet means are spaced at uniform intervals along said endless path.

10. The energy conversion system of claim 1 wherein said endless path is circular and is generated from a longitudinal central axis, said system having plural sets of said primary magnet means and plural sets of said secondary magnet means arranged along said longitudinal axis, 11. The energy conversion system of claim 10, having a rotational shaft positioned on said longitudinal axis, said plural sets of said primary magnet means being connected to said shaft.

12. The energy conversion system of claim 11 wherein the primary magnet means includes diametrically opposed magnets having the same polarity, said secondary magnets means including diametrically opposed magnets of opposite polarity.

13. The energy conversion system of claim 11 having first and second said primary magnet means positioned simultaneously to repel and attract different said secondary magnet means.

14. As an article of manufacture, a power couple for interconnection with a drive means to implement the usable energy from the drive means, said power couple including first and second magnet means, one of said magnet means comprising a plurality of lineally disposed magnets and the other of said magnet means being movable along a lineal path parallel to the lineal disposition of said plurality of lineally disposed magnets, means for interconnection of said other of said magnet means to the drive means for movement thereof along a lineal path, said plurality of magnets and said others of said magnet means being disposed with respect to each other to provide balanced magnetic function with at least one of said plurality of magnets disposed to attracting polarity with respect to said other magnet means concurrently with disposition of another of said plurality of magnets to repelling polarity with respect to said other magnet means, at least certain of said plurality of magnets being mounted for angular displacement in accordance with the magnetic force exerted thereon by proximity of said other magnet means with respect thereto and interconnectable for derivation therefrom of usable energy provided by angular displacement thereof.

* * * * *